US011204429B2

(12) United States Patent
Trost et al.

(10) Patent No.: US 11,204,429 B2
(45) Date of Patent: Dec. 21, 2021

(54) ELECTRONIC RADIATION DOSIMETER

(71) Applicant: Thermo Fisher Scientific Messtechnik Gmbh, Erlangen (DE)

(72) Inventors: Norbert Trost, Erlangen (DE); Erich Leder, Heroldsbach (DE); Reinhard Buchhold, Erlangen (DE)

(73) Assignee: Thermo Fisher Scientific Messtechnik Gmbh, Erlangen (DE)

(*) Notice: Subject to any disclaimer, the term of this patent is extended or adjusted under 35 U.S.C. 154(b) by 0 days.

(21) Appl. No.: 17/124,779

(22) Filed: Dec. 17, 2020

(65) Prior Publication Data

US 2021/0190973 A1 Jun. 24, 2021

Related U.S. Application Data

(60) Provisional application No. 62/952,722, filed on Dec. 23, 2019.

(51) Int. Cl.
*G01T 1/15* (2006.01)
*G01T 1/185* (2006.01)
*G01T 1/02* (2006.01)
*G01T 1/36* (2006.01)

(52) U.S. Cl.
CPC ............. *G01T 1/026* (2013.01); *G01T 1/15* (2013.01); *G01T 1/185* (2013.01); *G01T 1/365* (2013.01)

(58) Field of Classification Search
CPC .. G01T 1/026; G01T 7/00; G01T 1/02; G01T 1/185; G01T 1/365
See application file for complete search history.

(56) References Cited

U.S. PATENT DOCUMENTS

| 4,767,929 A * | 8/1988 | Valentine ............... G01T 1/026 250/370.07 |
| 7,157,715 B1 * | 1/2007 | Crain, Jr. ............... G01T 1/026 250/370.07 |
| 2017/0059721 A1 * | 3/2017 | Simanovsky ........... G01T 1/243 |
| 2018/0364373 A1 | 12/2018 | Hondongwa et al. |
| 2019/0187299 A1 | 6/2019 | Nelson |

FOREIGN PATENT DOCUMENTS

JP S5485082 A 7/1979

OTHER PUBLICATIONS

Jun. 7, 2021—(WO) International Search Report & Written Opinion—App. No. PCT/IB2020/001146.
Kaplan, G. "Integral and pulse mode silicon dosimetry for dose verification on radiation oncology modalities," PhD Thesis, Department of Engineering Physics, University of Wollongong (Jan. 1, 2001). http://ro.uow.edu.au/theses/1364.

\* cited by examiner

*Primary Examiner* — David P Porta
*Assistant Examiner* — Fani Boosalis
(74) *Attorney, Agent, or Firm* — Banner & Witcoff, Ltd.

(57) ABSTRACT

A radiation dosimeter includes a first radiation detector configured to operate in a counting mode, and a second radiation detector configured to operate in a current mode. A processor is configured to calculate a first detected dose of the first radiation detector, a second detected dose of the second radiation detector, and a total dose value using the first detected dose and the second detected dose. An alarm indicates when the total dose value is above a predetermined level.

20 Claims, 7 Drawing Sheets

ELECTRONIC RADIATION DOSIMETER

FIELD

Aspects of this disclosure relate generally to an electronic radiation dosimeter device that provides direct reading dose values in many kinds of ionizing radiation fields including pulsed radiation and, more particularly, to an electronic radiation dosimeter device with a first detector employing counting and a second detector employing charge integration.

BACKGROUND

The safety of personnel in the presence of pulsed ionizing radiation sources has become more important with the increase in usage of these sources over time. The term "radiation dosimeter" as used herein generally refers to a device that measures exposure to ionizing radiation. Such devices play a vital role for workers in certain industries where there is routine radiation exposure. It is important for these workers to monitor the cumulative dose to which they are exposed over time to ensure that such exposure does not exceed safe levels. There are a number of types of radiation dosimeters available that fall into two general classes.

The first class is referred to as a "passive" dosimeter that is sensitive to ionizing radiation and records a value of cumulative radiation dose (also sometimes referred to in a biological context as an "effective dose" or "equivalent dose" value that may be measured in units including Sievert ("Sv"), or in a physical context that may be measured in units including Gray ("Gy"). Typical embodiments of passive dosimeters do not have the capability to directly communicate the dose value to the user nor do they have the ability to alert the user of immediate radiation hazard. Passive dosimetry devices, such as for example thermoluminescent dosimeters ("TLD") are widely used to monitor exposure to radiation. Typical embodiments of passive dosimeter devices provide a cumulated reading of exposure that represents the dose received over an extended period of time. In some cases, the exposure reading is provided weeks or months after the actual exposure to the ionizing radiation.

The second class of dosimeter is referred to as an "active" dosimeter, which may include an "electronic personal radiation dosimeter" that continuously measures and provides a communication reporting the dose value to the user. Because it is monitoring the dose value in real-time, it can also provide a dose rate (e.g. Sv/h) that cannot be provided by a passive dosimeter. Also, many embodiments of electronic personal radiation dosimeter may include an alarm function that provides the user with an audible and/or visual and/or tactile (e.g. vibrating) indication that a threshold dose or dose rate value has been reached. Similarly, many embodiments of electronic personal radiation dosimeter may include a record of dose history that provides the user with an indication of the dose received as a function of time. True active dosimetry provides a significant benefit over passive dosimetry because users can be informed in "real-time" when they have entered a radiation field that may pose a danger to the user, thus providing the user with the opportunity to remove themselves from harm's way. The term "real-time" as used herein typically refers to reporting, depicting, or reacting to events at the same rate and sometimes at the same time as they unfold (e.g. within a few seconds or fractions of a second) rather than taking notice of a much later report.

As used herein, "counting mode" is used to mean "pulse counting mode" as described in Glenn/Knoll, Radiation Detection and Measurement, fourth edition chapter 4-11, incorporated herein by reference. Currently available electronic personal radiation dosimeters typically operate in counting mode. For example, in a typical embodiment of a counting device, photons of radiation are detected and processed into a signal. If that signal matches appropriate parameters (e.g. amplitude, shape, etc.) it is counted as an event (also referred to as a "count") that corresponds to an increment of dose. Many embodiments of personal radiation dosimeters also use dead time correction. See Glenn/Knoll, chapter 4-VII. Thus, event counting devices are able to provide real-time alerts (e.g. audible alarms, visual alarms, or tactile vibration alarms) when the count rate is high, or when the accumulated counts reach some preset level.

Active dosimetry for ionizing radiation has traditionally focused on measurements of what is referred to as a "personal dose equivalent". The term "personal dose equivalent" as used herein generally refers to a quantity of ionizing radiation representing a safety threshold for exposure recommended by the International Commission on Radiation Units and Measurements (ICRU) for the dose equivalent in tissue at depth (d) below a specified point on the body. Examples of personal dose equivalents include a deep dose (e.g. for thoracic exposure) equivalent safety threshold value referred to as $H_p(10)$, an eye dose equivalent safety threshold value referred to as $H_p(3)$, and a surface dose (e.g. for skin exposure) equivalent safety threshold value of about $H_p(0.07)$. Those of ordinary skill in the related art appreciate that it is advantageous to monitor dose equivalent values for personnel who may be routinely exposed as part of their profession, such as for example personnel who work in the fields of interventional radiology and cardiology as well as the nuclear power and aviation industries.

Unlike passive dosimeters, active dosimeters may have an upper limitation with respect to the dose rate. Those radiation fields that are very strong (sometimes referred to as "high fields" or "high intensity fields") may exceed the range of detection elements employed with counting active dosimeters and need to be detected by the instrument in order to alert the user instantaneously ("over-range-detection") of a potentially hazardous condition. For example, event counting electronic personal radiation dosimeters may include detection elements such as one or more sensors, signal processors, and/or counting electronics that generally operate linearly. This can lead to missed event counts (sometimes referred to as "dead time"), and in some situations high fields can lead to saturation of one or more detection elements where the count rate saturates or even drops while the field strength increases (sometimes referred to as "fold over"). Conventionally, the deviation of the measured count rate from a linear dependency in respect to the radiation field strength can be corrected by applying a so-called and well-known dead time correction formula. However, such dead-time correction can only work correctly if the radiation field is of continuous nature during the time interval of the analysis.

Currently available counting electronic personal radiation dosimeters, however, are known to have limited performance with respect to so-called pulsed radiation fields where the dose rate in the radiation pulse may be very high, (and too high for the correct registration in the instrument) while the dose rate averaged over a macroscopic time (e.g., a second or minute) is well within the specified dose rate measuring range. Typical examples for such pulsed radiation fields are medical x-ray devices with a radiation pulse width of several milliseconds, pulsed linear accelerators (LINACs) with a pulse width of typical several microseconds, and x-ray flash instruments with a typical pulse width of 10 to 50 nanoseconds.

It is appreciated that high intensity fields can exhibit significantly shorter durations of time than the specified interval that an event counting device is capable of measuring. These ultra-short duration events where the radiation pulse duration is in the order or even much less than the signal resolution time (or dead time) of the counting device are often referred to as "radiation flashes". These radiation flashes are not accurately measureable by currently available active dosimeters and present a significant problem for users exposed to them. For example, this is increasingly important due to the growing use of pulsed fields in linear accelerators (LINACs), and non-destructive test (NDT) applications. It is generally appreciated that exposure to this kind of pulsed field needs to be accurately measured for the safety of personnel who are at risk of exposure.

Some embodiments of radiation dosimeter utilize what are referred to as "ionization chambers" that are well suited for detecting pulsed radiation. However, in order to integrate the dose correctly, even at a low dose rate, voluminous ionization chambers are necessary. The use of ionization chambers is therefore reserved for larger devices that are not easily carried or worn by a user.

Compared to ionization chamber radiation dosimeter devices, electronic personal radiation dosimeters have the advantage of achieving comparable sensitivity with much smaller detectors and thus allow the overall device to be significantly smaller. The international standard for active dosimeters (International Electrotechnical Commission ("IEC") Standard 61526) specifies maximum dimensions of 15 cm×3 cm×8 cm and a maximum weight of 300 g. Actual electronic dosimeters on the market are typically significantly smaller and lighter for the convenience of the wearer.

In particular, embodiments of electronic personal radiation dosimeters may include what are referred to as "PIN diode" type detectors. Electronic personal dosimeters have been described as state of the art for decades, such as in GB 2 255 177. The term "PIN diode", also sometimes referred to as a "p-type, intrinsic, n-type diode", is generally understood by those of ordinary skill in the related art to include a diode with a wide region of undoped intrinsic semiconductor material contained between a p-type semiconductor and an n-type semiconductor. Advantageously, PIN diodes can be operated either in counting mode or as ionization chambers. For example, while a typical PIN diode detector operated in counting mode will still integrate the dose correctly even at dose levels near background (e.g.—below 0.1 μSv/h), a corresponding PIN diode operated in ion-chamber mode provides only currents in the order of 1 pA at dose rates of mSv/h. Due to the need for correct operation of the electronic personal radiation dosimeter at low dose levels, it is advantageous to operate the PIN diode detectors in counting mode.

Compared to passive type dosimeters and ionization chambers, current electronic personal radiation dosimeters have the disadvantage of being unable to capture the dose of a pulse correctly once the maximum dose rate for continuous radiation is exceeded. Electronic personal radiation dosimeters can correctly measure the dose of short duration (typically <a few μs) pulsed X-rays, as long as the dose per X-ray pulse is smaller than the dose per count in continuous radiation. However, there are situations where a user is exposed to a dose rate that is too large for a correct dose indication in an electronic personal radiation dosimeter. In such cases the electronic personal radiation dosimeter typically fails to alert the user to the danger due to the fact that the electronic personal radiation dosimeter cannot accurately compute a measurement of the dose from the exposure. For example, a user may be exposed to the direct beam of an industrial x-ray flash generator that produces a field of pulsed radiation that exceeds the measurement capability of the electronic personal radiation dosimeter worn by the user.

Usability of current active electronical dosimeters is very limited in fields of pulsed ionizing radiation. This type of instrument uses radiation detectors operating in counting mode. This implies that the measured dose of a radiation pulse that exceeds the dose per pulse sensitivity of the used detector is truncated. (IEC 62743).

FIG. 1 illustrates the maximum dose per radiation pulse that can be detected by a typical conventional electronical dosimeter, with the shaded area below the line showing the dose levels that can be measured with a typical conventional electronical dosimeter for a range of radiation pulse widths from each of X-ray flash devices, accelerators, and medical X-ray sources. Because of this limitation of electronic dosimeters, actually mostly passive dosimeters (e.g., TLD, optically stimulated luminescence ("OSL"), and Film) are used for determining the personal dose of a person, which dosimeters do not provide the user with a direct dose readout. Other detector techniques which are suited for pulsed radiation like direct ion storage ("DIS") have limitations in sensitivity and readout frequency to provide immediate readings and alarms.

It would be desirable to provide an electronic radiation dosimeter device that achieves real-time responsiveness and can accurately measure a user's exposure to all kinds of ionizing radiation including pulsed radiation fields and to a single x-ray flash, and that reduces or overcomes some or all of the difficulties in prior known designs. Particular objects and advantages will be apparent to those skilled in the art, that is, those who are knowledgeable or experienced in this field of technology, in view of the following disclosure and detailed description of certain embodiments.

SUMMARY

In accordance with a first aspect, a radiation dosimeter may include a first radiation detector configured to operate in a counting mode and a second radiation detector configured to operate in a current mode. A processor may be configured to calculate a first detected dose of the first radiation detector, a second detected dose of the second radiation detector, and a total dose value using the first detected dose and the second detected dose. An alarm may indicate when the total dose value is above a predetermined level.

In accordance with another aspect, a method includes operating a first radiation detector in a counting mode; operating a second radiation detector in a current mode; calculating a first detected dose of the first radiation detector and a second detected dose of the second radiation detector, and a total dose value using the first detected dose and the second detected dose; and activating an alarm when the total dose value is above a predetermined level.

Aspects disclosed herein provide a radiation dosimeter the calculates a total radiation dose with event counting and charge integration. These and additional features and advantages disclosed here will be further understood from the following detailed disclosure of certain embodiments, the drawings thereof, and from the claims.

BRIEF DESCRIPTION OF THE DRAWINGS

The foregoing and other features and advantages of the present embodiments will be more fully understood from the following detailed description of illustrative embodiments taken in conjunction with the accompanying drawings in which.

Figure 1:
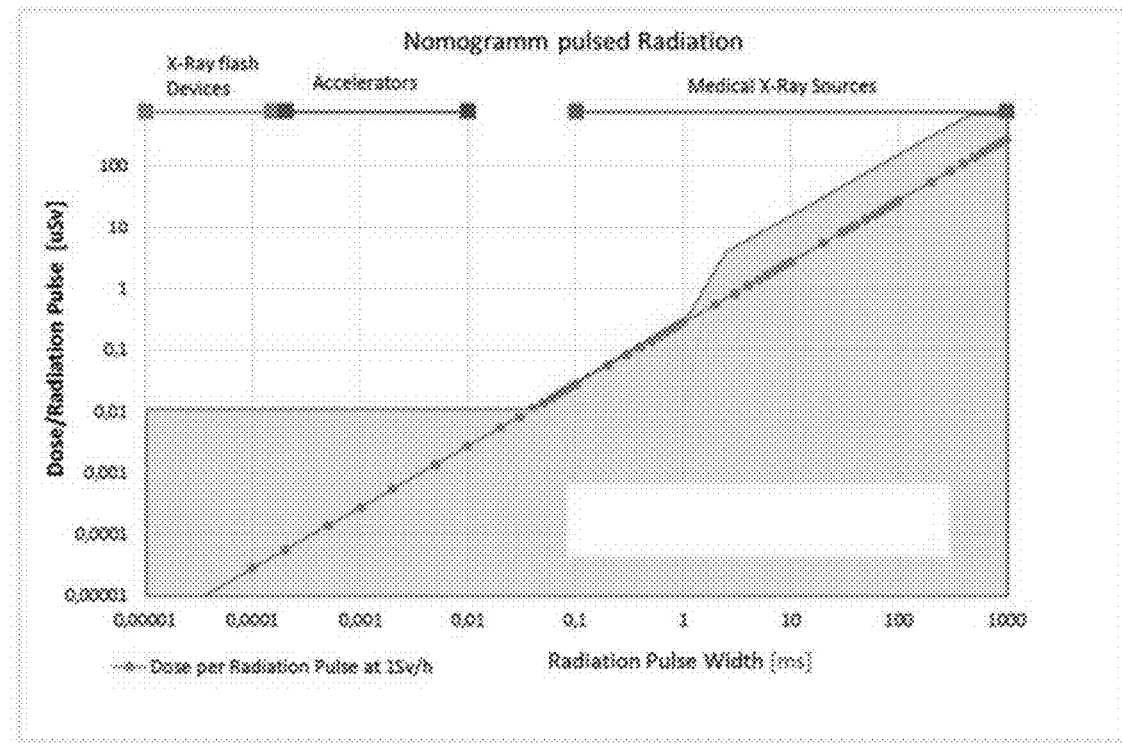
FIG. 1 is a graph showing detectable dose/pulse values for prior art dosimeters.

The figures referred to above are not drawn necessarily to scale, should be understood to provide a representation of particular embodiments, and are merely conceptual in nature and illustrative of the principles involved. Some features depicted in the drawings have been enlarged or distorted relative to others to facilitate explanation and understanding. The same reference numbers are used in the drawings for similar or identical components and features shown in various alternative embodiments. Radiation dosimeters as disclosed herein would have configurations and components determined, in part, by the intended application and environment in which they are used.

DETAILED DESCRIPTION OF EMBODIMENTS

Embodiments disclosed herein provide a radiation dosimeter with a first detector that employs counting and a second detector that employs charge integration.

Figure 2:
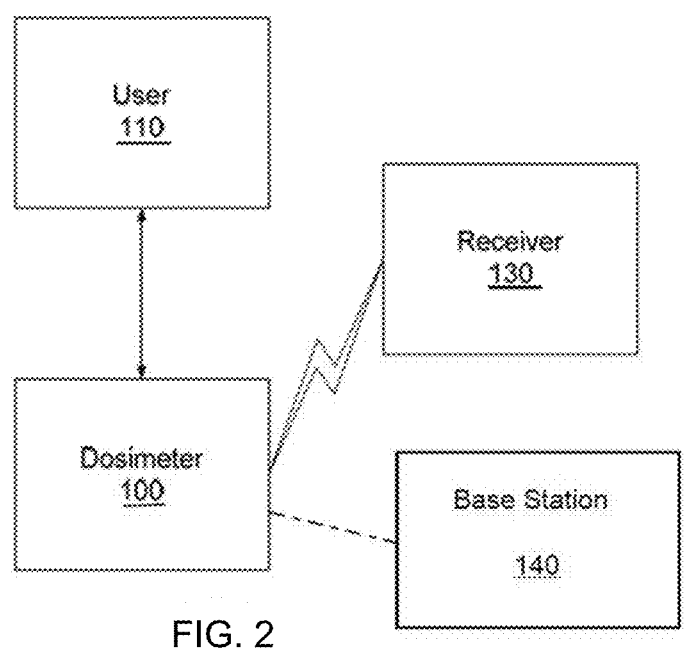
FIG. 2 is a functional block diagram of an electronic personal radiation dosimeter and user including an optional wireless receiver.

FIG. 2 provides a simplified illustrative example of a dosimeter 100 that is typically worn on the body of the user 110. Dosimeter 100 may be positioned at various locations on the users' body. For example, a whole body dosimeter may be positioned at the user's breast or belt, a finger dosimeter may be positioned on the user's finger, and an eye dosimeter may be positioned at the user's head. A receiver 130 may receive and/or transmit one or more wireless communications from and to dosimeter 100, and in some embodiments may provide user 110 with real-time information on a radiation dose detected by dosimeter 100 based on the communications received. In some embodiments, receiver 130 may include a smart phone, tablet, other general-purpose wireless-capable device, or any receiver type device known in the field of active dosimetry. The term "close proximity" as used herein in reference to the spatial relationship between dosimeter 100 and user 110, and generally refers to a location within a range where user 110 can unambiguously identify a signal from dosimeter 100 and respond accordingly. For example, an acceptable range may depend on the type and/or intensity of the signal or combination of signals provided by dosimeter 100 such as audible, visual, or mechanical (e.g. vibration) signals. It is to be appreciated that the dosimeter 100 may provide various pieces of information to user 110 including numerical information regarding accumulated dose, current dose rate and various means of instantaneous alarm notification, which may include an optical or visual signal, an audible sounder, and a tactile vibration alarm.

In certain embodiments, dosimeter 100 may be configured to engage with a base station 140 when not in use by user 110. Embodiments of base station 140 may provide a charging capability for dosimeter 100, as well as a network connection that provides the capability for dosimeter 100 to transmit data to other computing devices via the network and/or receive information such as software updates, detection parameters, security identifiers, etc. In certain embodiments, base station 140 may include a processor or microprocessor as well as data storage elements that may be particularly useful if a consistent network connection is not available.

Figure 3:
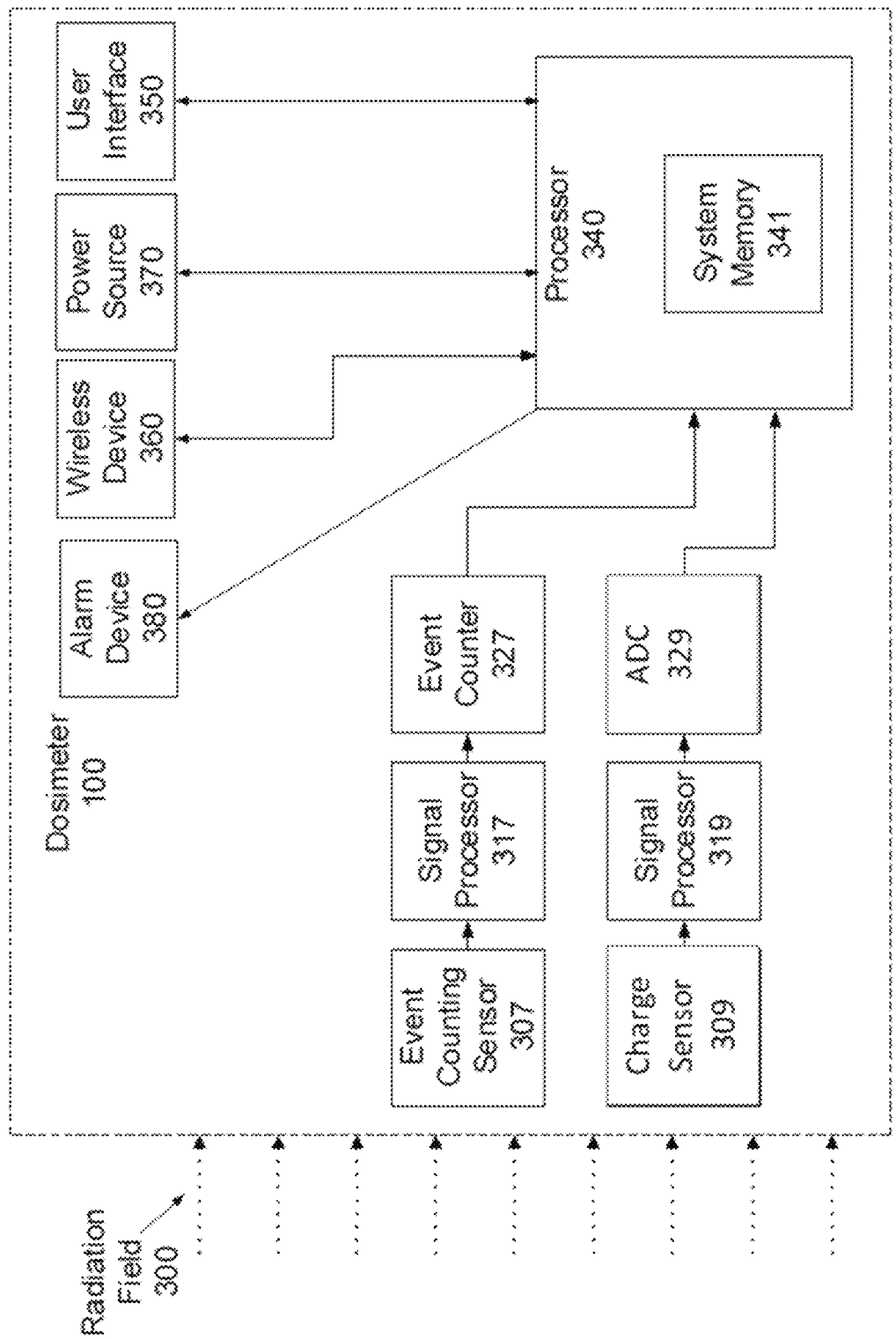
FIG. 3 is a functional block diagram of an embodiment of the electronic personal radiation dosimeter of FIG. 1.

An illustrative example of an embodiment of a dosimeter 100 capable of providing a measurement of a user's exposure using at least two sensors is shown in FIG. 3. Dosimeter 100 may include an event counting sensor 307, which may be enabled to measure particular aspects of a radiation field 300, and a charge sensor 309. A first signal processor 317 may process signals from event counting sensor 307, and a second signal processor 319 may process signals from charge sensor 309. Each of first signal processor 317 and second signal processor 319 may include signal processing components known to those of ordinary skill in the art (e.g., amplifiers, comparators, etc.). First signal processor 317 may receive the output from event counting sensor 307 and provide a signal of a detected ionizing event, which signal may then be provided to an event counter 327. Event counter 327 may integrate the number of events, which is equivalent to a dose value. The number of events detected over a period of time (e.g., between approximately 1 ms and approximately 1 second), may also be communicated to a processor 340. It is to be appreciated that such a measurement may be an average of detection events over a unit of time, such as counts per second ("cps") equivalent to a dose rate.

In certain embodiments, processor 340 may include one or more processors and/or microprocessors coupled with system memory 341 that includes one or more data storage elements, which may use solid state storage technologies known in the related art. In certain embodiments, processor 340 may employ control logic (e.g. software programs, including program code) stored in system memory 341. The control logic of processor 340, when executed by processor 340, may cause the processor to perform functions described herein. For example, processor 340 may implement software that executes a processing algorithm that receives inputs from event counters 327 and 329, and sends and receives information to/from a user interface 350 of dosimeter 100. In certain embodiments, user interface 350 may include a display (e.g. liquid crystal display, touch screen comprising a graphical user interface (GUI), or other type of display interface known in the related art), and one or more buttons to activate various features of dosimeter 100.

Dosimeter 100 may also include a wireless device 360, which may include a radio element and a wireless antenna. Wireless device 360 may communicate with receiver 130 via any wireless technology known to those of ordinary skill in the related art and may depend, at least in part, on various criteria. The criteria may include, but is not limited to, range of transmission, data security, power requirements, physical dimension of radio and/or antenna, 1-way or 2-way communication, or other criteria. For example, direct device to device communication can be achieved using what is generally referred to as "Bluetooth" technology, which has become a standard for exchanging data over short distances using short-wavelength UHF radio waves. Alternatively, wireless device 360 may communicate with receiver 130 via an intermediate device. Some examples of communication intermediate using intermediate devices include Wi-Fi communicating via wireless router devices, and cellular based communications utilizing cellular communication points supported by a telecommunications provider (e.g. a text-based standard for communication (also referred to as "short message service" (SMS)).

Various components of dosimeter 100 may receive power from a power source 370, which may include one or more batteries that in some embodiments may be rechargeable. Dosimeter 100 may also include an alarm device 380, which may include one or more of a speaker interface for audible communication (e.g. an alert message or alarm), visual alarm indicators (e.g., lights), and/or tactile alarm indicators.

In the described embodiments, each of event counting sensor 307 and charge sensor 309 may be enabled to detect one or more of gamma radiation, beta radiation, neutron radiation, and x-ray-radiation. The specific sensor technology may depend, at least in part, on the type(s) of radiation that the embodiment of dosimeter 100 is designed to measure. For example, charge sensor 309 may include a photodiode with a "PIN diode detector" capable of measuring at least gamma radiation and x-ray radiation.

Figure 4:
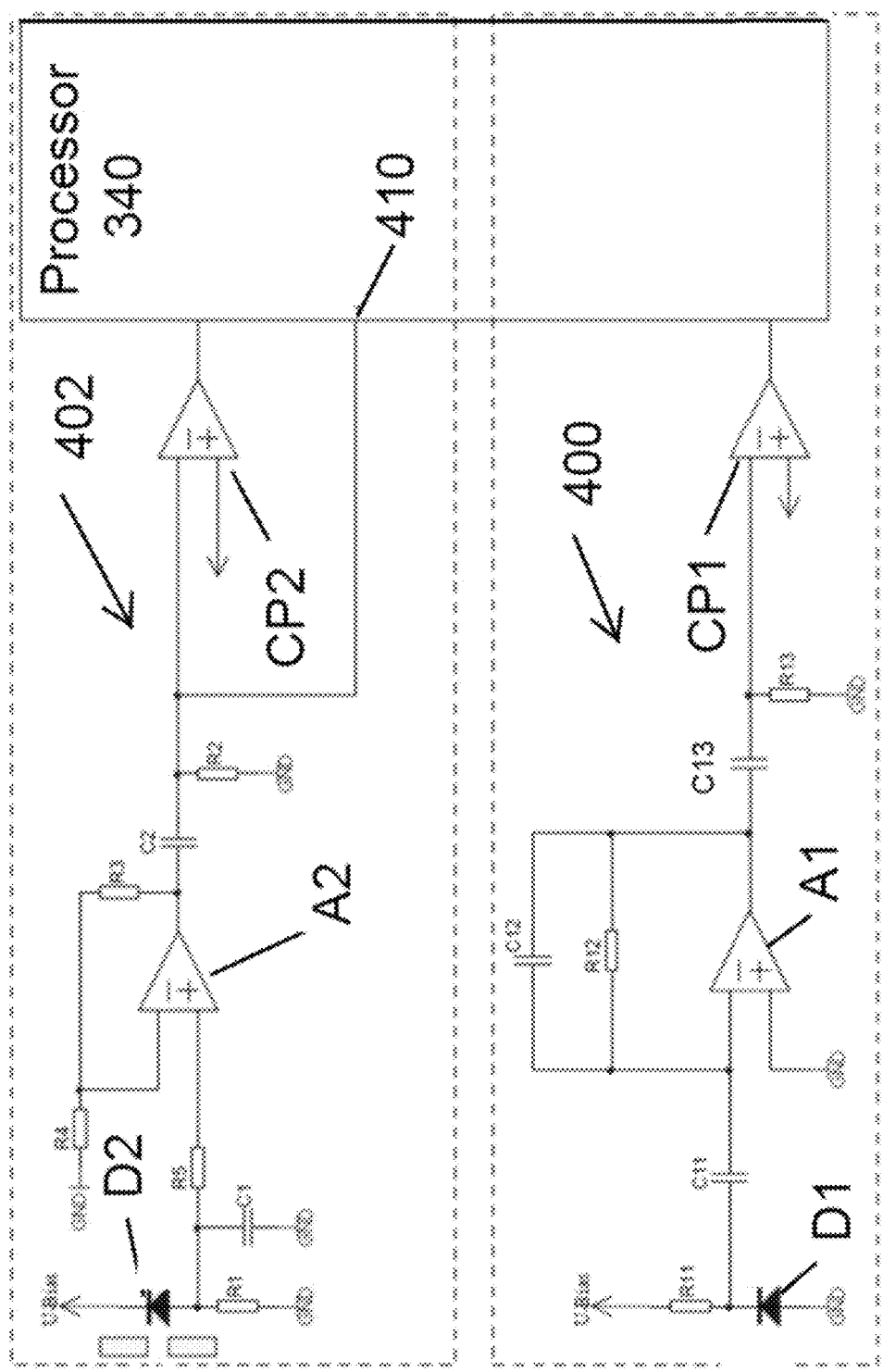
FIG. 4 is a schematic diagram of an embodiment of a circuit of a radiation dosimeter of FIG. 1.

FIG. 4 illustrates exemplary circuits used for dosimeter 100, and includes a first branch 400 associated with a counting sensor 307, and a second branch 402 associated with charge sensor 309, each of which may be connected to processor 340. Counting sensor 307 is a conventional counting sensor, which includes a first PIN diode D1 adjacent a resistor R11 and a capacitor C11. The signal from diode D1 passes through an amplifier A1, positioned in parallel with a parallel resistor R12 and capacitor C12 circuit. The amplified signal is sent to a coupling element including a capacitor C13 and a resistor R13, and on to a first comparator CP1, from which the signal passes to processor 340. Each photon ionizing at PIN diode D1 is captured as a pulse and counted as a single event in this conventional branch. Such a conventional counter is configured to measure or count short pulses, e.g., pulses of between approximately 1 ms and approximately 10 ms. However, at high dose rates such a conventional counter can get saturated and may no longer be effective. As illustrated here, first branch 400 includes a single first diode D1. It is to be appreciated that in other embodiments, one or more additional first diodes D1 may be employed as additional counting devices.

Second branch 402, which is associated with charge sensor 309, includes a second PIN diode D2. Ionizing radiation will create electron hole pairs in the intrinsic zone of PIN diode D2, which causes current flowing through PIN diode D2 and a charging capacitor C1 positioned in parallel with resistor R1. The signal may pass through a resistor R5 and an amplifier A2, with amplification defined by resistors R3 and R4. A coupling RC element of a capacitor C2 and a resistor R2 is positioned between amplifier A2 and a comparator CP2. An input 410 to an analog-to-digital converter ("ADC") of processor 340 is also illustrated.

It is to be appreciated that during a radiation flash itself no semiconductor functionality (i.e., amplifier A2 and comparator CP2) is needed because at high radiation intensities, silicon amplifiers become conductive and no amplification takes place. Amplifier A2 and comparator CP2 will recover around 10 μs after a radiation pulse, and a readout of the charge stored in capacitor C1 can begin by cyclically (e.g., every 10 μs) reading the analog value at the amplifier output, integrate these values and use the integral as an equivalent of the stored charge of capacitor C1. Integration of the voltage of capacitor C1 may be stopped if the voltage falls below the threshold voltage of comparator CP2. It is to be appreciated that rather than have comparator CP2 start and stop the ADC conversions, the ADC could run continuously and integration starts/stops at according values. But this would not allow the controller to sleep and power consumption of the system would be high.

By decoupling the output of amplifier A2 from the ADC input 410 by capacitor C2, the temperature dependent dark current of the PIN diode D2 is suppressed. The time constant of the coupling RC element R2*C2 is chosen large enough that the effect on amplitude reduction is negligible. Practical values are between approximately 10 ms and approximately 1000 ms. Because all accelerator and X-Ray flash devices have a huge pause to pulse ratio, a DC loading of the ADC input 410 will not occur. Baseline restoring techniques may be applied if required.

Figure 5:
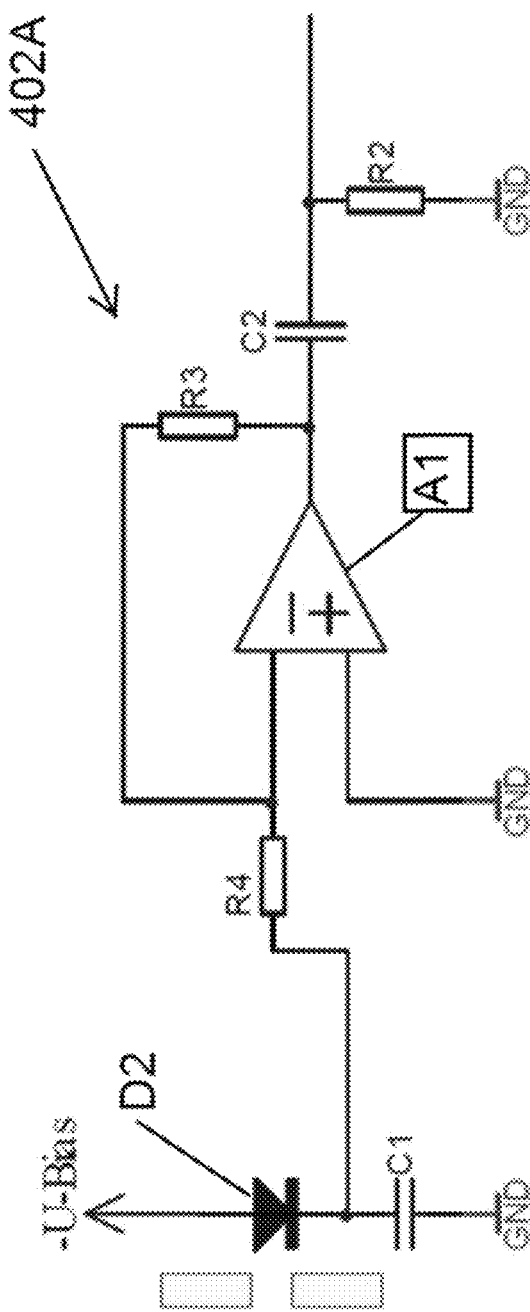
FIG. 5 is a schematic diagram of an alternative embodiment of the circuit of FIG. 3.

An alternative embodiment of a circuit for second branch 402 is illustrated in FIG. 5, and uses a negative bias voltage. In this embodiment, the time constant of the coupling RC element C1*R4 may be between approximately 100 μs and approximately 1000 μs, and the the time constant of the coupling RC element R3*C2 may be between approximately 10 ms and approximately 1000 ms.

Figure 6:
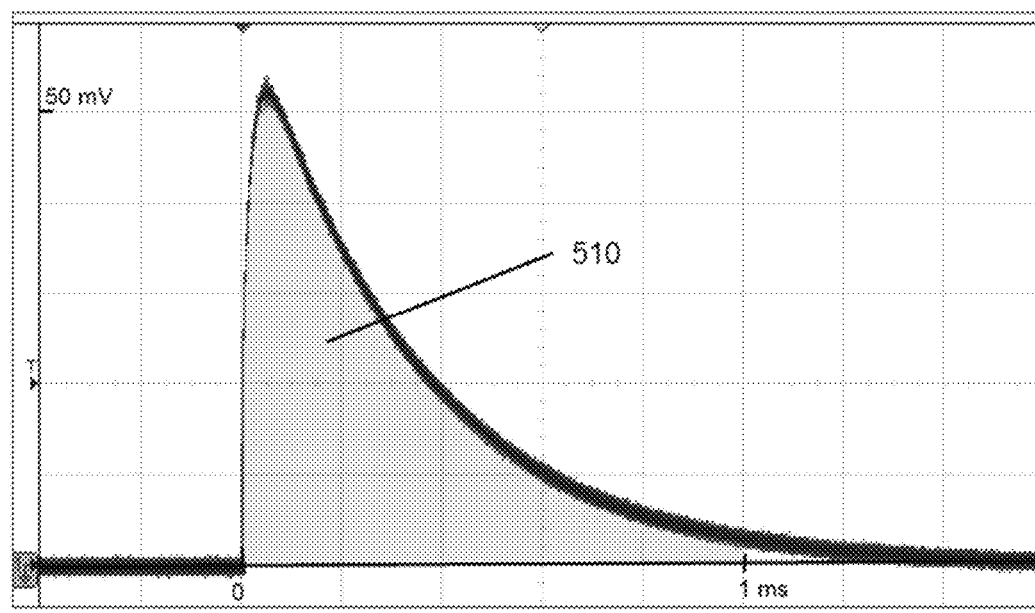
FIG. 6 is a graph illustrating the charge of a capacitor of the circuit of FIG. 4.

A graph illustrating the voltage at capacitor C1 of second branch 402 is seen in FIG. 6. The area under the curve 510 is equivalent to the dose of radiation received at PIN diode D2. This exemplary graph represents a typical electrical pulse at capacitor C1 from a 0.1 μs radiation pulse of a typical X-ray flash device at a 1 m distance in a main beam (30 v dose) for a typical 7 mm² low cost PIN diode and capacitance of 400 pF for capacitor C1 and an R value of 1 Mohm, with a bias voltage of 10V. The integral (area below the line) of the ADC converted voltages of capacitor C1 may be multiplied by a calibration factor (Sv/summed Bits) to form the radiation pulse value. The counts from event counting sensor 307 may be summed together and multiplied by a calibration factor (Sv/count) to form the dose value for continuous radiation, and the radiation pulse value may then be added to the count value to provide a total dose value.

Figure 7:
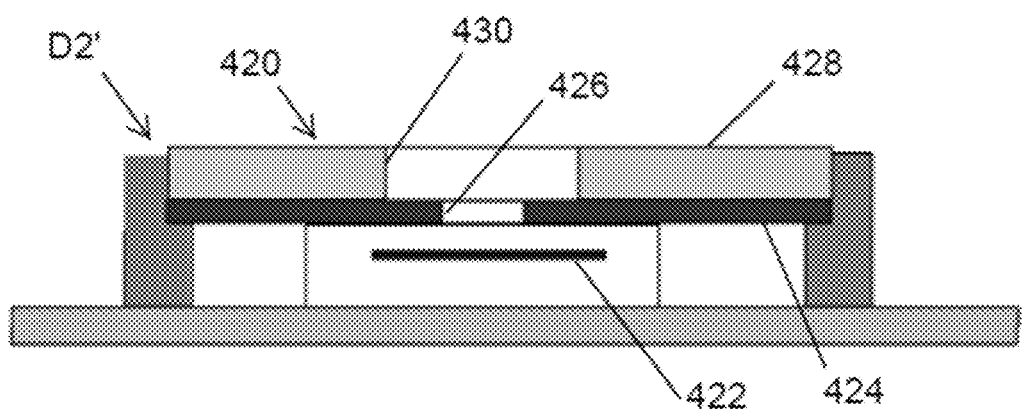
FIG. 7 is a schematic diagram of a radiation pulse detector of the dosimeter of FIG. 2, shown with a filter.
Figure 8:
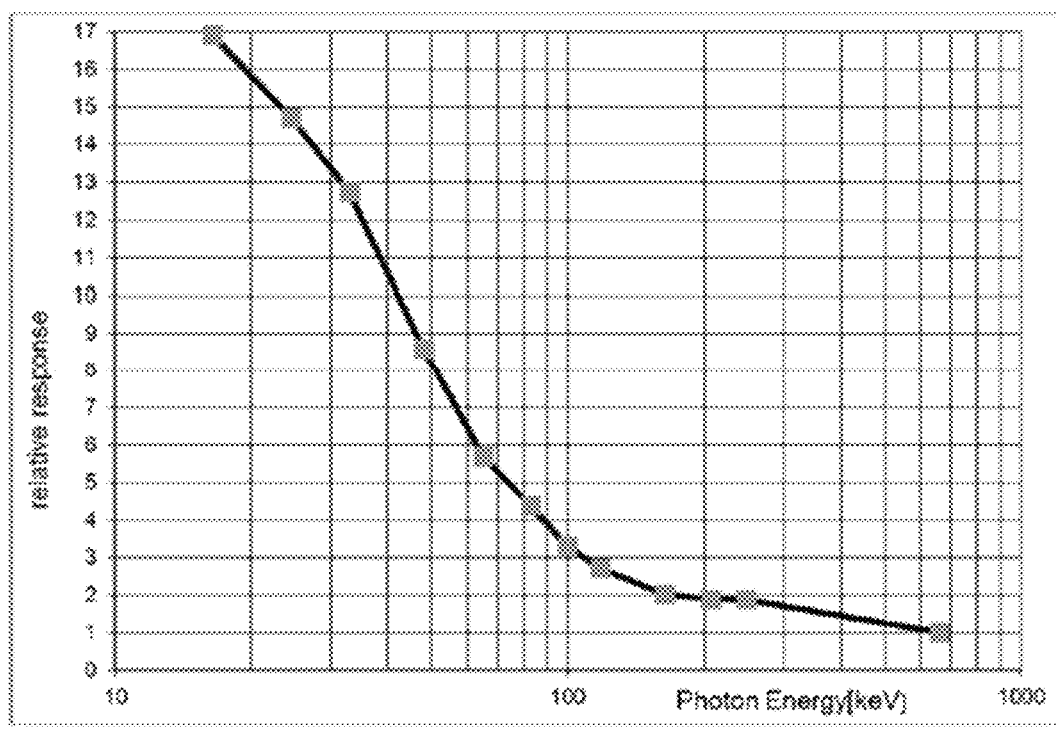
FIG. 8 is a graph showing the energy response of the radiation pulse detector of FIG. 2.
Figure 9:
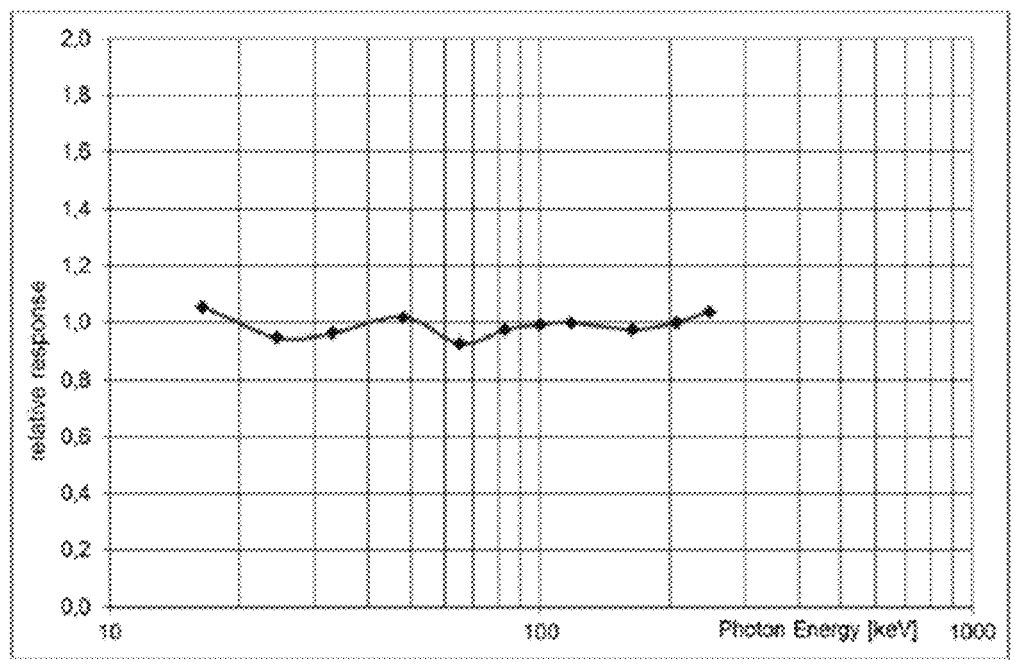
FIG. 9 is a graph showing the energy response of the radiation pulse detector of FIG. 7 with the filter.

An alternative embodiment of a PIN diode D2' of second branch 402 is illustrated in FIG. 7. In this embodiment, a filter 420 partially covers a detector 422 of PIN-diode D2'. Filter 420 may include a first shield 424 including an opening or aperture 426, which exposes a portion of detector 422. First shield 424 may be formed of a medium Z material, such as copper, for example. Filter 420 may also include a second shield 428 including an opening or aperture 430, which exposes a portion of detector 422. Second shield 428 may be formed of a high Z material, such as tin, for example. Filter 420 may serve to smooth the energy response of PIN diode D2, as illustrated in FIGS. 8-9, which show the relative response of a non-filtered PIN diode D2 (FIG. 8) and the relative response of a filtered Diode D2 (FIG. 9). It is to be appreciated that a filter may also be used with first PIN diode D1.

Figure 10:
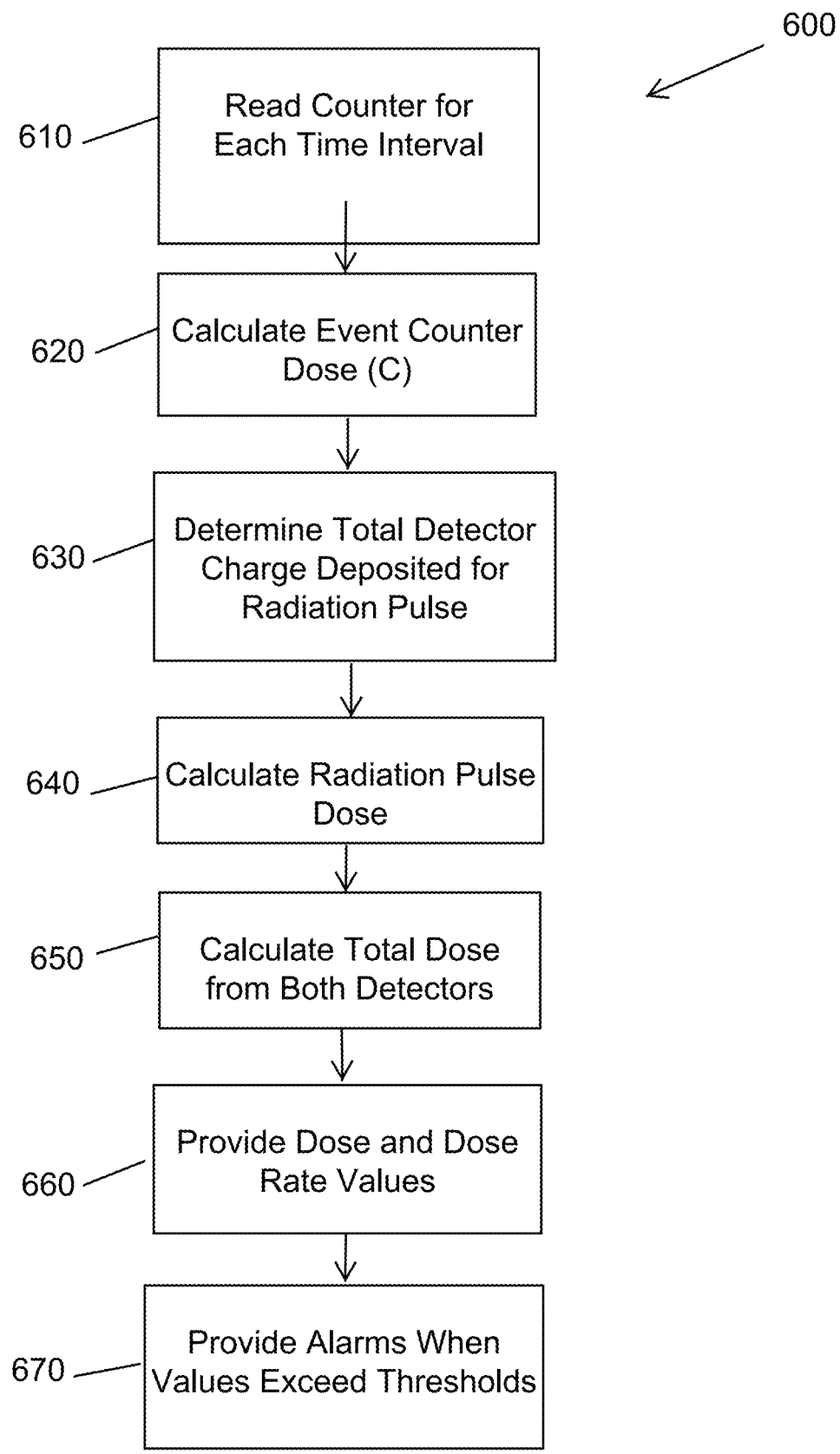
FIG. 10 depicts a flow diagram of the calculation of a total dose from the event counting sensor and the charge sensor of FIG. 3.

A method 600 of utilizing dosimeter 100 with counting sensor 307 and charging sensor 309 is illustrated in FIG. 10. At step 610, event counter 327 of event counting sensor 307 is read for each selected time interval. At step 620, the event counter dose (C) is calculated by multiplying the count sensitivity by the number of counts. At step 630, the total detector charge deposited on capacitor C1 is determined for a radiation pulse. At step 640, the radiation pulse dose (P) is calculated by multiplying the charge sensitivity by the charge of the radiation pulse. At step 650, the total dose from both detectors is calculated by adding the event counter dose (C) to the radiation pulse dose (P). At step 660, the dose and dose rate values are provided to the user at user interface 350 of dosimeter 100. At step 670, alarms are provided to dosimeter 100 via alarm device 380 when predetermined threshold values are exceeded.

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the invention. Substitutions of elements from one described embodiment to another are also fully intended and contemplated. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples, but are encompassed by the following claims.

What is claimed is:

1. A radiation dosimeter comprising:
a first radiation detector configured to operate in a counting mode;
a second radiation detector configured to operate in a current mode;
a processor configured to calculate a first detected dose of the first radiation detector and a second detected dose of the second radiation detector, and a total dose value using the first detected dose and the second detected dose;
an alarm to indicate when the total dose value is above a predetermined level; and
a first filter positioned on the first radiation detector and a second filter positioned on the second radiation detector,
wherein the first and second filters are configured to provide a substantially flat energy response.

2. The radiation dosimeter of claim 1, wherein the second radiation detector is a PIN-Diode detector.

3. The radiation dosimeter of claim 2, wherein a dark current component of the PIN-Diode detector is separated by capacitive coupling.

4. The radiation dosimeter of claim 1, further comprising a capacitor configured to store a detector charge generated in the second radiation detector from a radiation pulse.

5. The radiation dosimeter of claim 4, further comprising a resistor and an amplifier,
wherein the amplifier comprises a semiconductor, and
wherein the resistor prevents discharge of the detector charge stored in the capacitor during radiation pulse ionizing the semiconductor of the amplifier and making the amplifier input conductive.

6. The radiation dosimeter of claim 1, wherein the total dose value is a sum of the first detected dose and the second detected dose.

7. The radiation dosimeter of claim 6, wherein the first detected dose is multiplied by a calibration factor (Sv/count) to form a dose value for continuous radiation, and the second detected dose is added to the dose value for continuous radiation to provide the total dose value.

8. The radiation dosimeter of claim 1, further comprising a third radiation detector configured to operate in a counting mode.

9. A method comprising:
operating a first radiation detector in a counting mode;
operating a second radiation detector in a current mode;
calculating a first detected dose of the first radiation detector and a second detected dose of the second radiation detector, and a total dose value using the first detected dose and the second detected dose; and
activating an alarm when the total dose value is above a predetermined level,
wherein a first filter is positioned on the first radiation detector and a second filter is positioned on the second radiation detector, and
wherein the first and second filters are configured to provide a substantially flat energy response.

10. The method of claim 9, wherein the second radiation detector is a PIN-Diode detector.

11. The method of claim 10, wherein a dark current component of the PIN-Diode diode detector is separated by capacitive coupling.

12. The method of claim 9, further comprising a capacitor configured to store a detector charge generated in the second radiation detector from a radiation pulse.

13. The method of claim 12, further comprising a resistor and an amplifier,
wherein the amplifier comprises a semiconductor, and
wherein the resistor prevents discharge of the detector charge stored in the capacitor during radiation pulse ionizing the semiconductor of the amplifier and making the amplifier input conductive.

14. The method of claim 9, wherein the total dose value is a sum of the first detected dose and the second detected dose.

15. The method of claim 14, wherein the first detected dose is multiplied by a calibration factor (Sv/count) to form a dose value for continuous radiation, and the second detected dose is added to the dose value for continuous radiation to provide the total dose value.

16. The method of claim 9, further comprising a third radiation detector configured to operate in a counting mode.

17. A radiation dosimeter comprising:
a first radiation detector configured to operate in a counting mode;
a second radiation detector configured to operate in a current mode, wherein the second radiation detector is a PIN-Diode detector, and wherein a dark current component of the PIN-Diode detector is separated by capacitive coupling;
a processor configured to calculate a first detected dose of the first radiation detector and a second detected dose of the second radiation detector, and a total dose value using the first detected dose and the second detected dose; and an alarm to indicate when the total dose value is above a predetermined level.

18. A method comprising:

operating a first radiation detector in a counting mode;

operating a second radiation detector in a current mode, wherein the second radiation detector is a PIN-Diode detector, and wherein a dark current component of the PIN-Diode detector is separated by capacitive coupling;

calculating a first detected dose of the first radiation detector and a second detected dose of the second radiation detector, and a total dose value using the first detected dose and the second detected dose; and activating an alarm when the total dose value is above a predetermined level.

19. A radiation dosimeter comprising:

a first radiation detector configured to operate in a counting mode;

a second radiation detector configured to operate in a current mode;

a third radiation detector configured to operate in a counting mode;

a processor configured to calculate a first detected dose of the first radiation detector and a second detected dose of the second radiation detector, and a total dose value using the first detected dose and the second detected dose; and an alarm to indicate when the total dose value is above a predetermined level.

20. A method comprising:

operating a first radiation detector in a counting mode;

operating a second radiation detector in a current mode;

calculating a first detected dose of the first radiation detector and a second detected dose of the second radiation detector, and a total dose value using the first detected dose and the second detected dose; and activating an alarm when the total dose value is above a predetermined level, wherein a third radiation detector is configured to operate in a counting mode.

* * * * *